Patented Dec. 10, 1935

2,023,815

UNITED STATES PATENT OFFICE 2,023,815

PRIMARY CELL

Martin L. Martus, Woodbury, and Edmund H. Becker, Waterbury, Conn.

No Drawing. Application October 31, 1934, Serial No. 750,902

5 Claims. (Cl. 136—116)

This invention relates to primary cells; and it comprises a primary cell of the type using a depolarizer and a caustic alkali electrolyte wherein a small amount of zirconium oxid ($ZrO_2$) is present, the amount usually being about 1 to 8 grams per liter of electrolyte, titanium oxid ($TiO_2$) being occasionally used to replace some or much of the zirconia; all as more fully hereinafter set forth and as claimed.

There are many types of primary battery cells for closed circuit work, such as in running telegraph circuits. The most used type employs a zinc electrode and a copper oxid electrode, with a caustic soda electrolyte. Another type makes use of an activated carbon electrode in place of the copper oxid. In both types the electrolyte is of a fairly well standardized concentration, the concentration being rather high. The depolarizing material (copper oxid or activated carbon) is retained or mounted in various ways, as by providing a basket containing the granular material or molding the material in slabs or sticks with the aid of a binder; e. g. copper sulfate in the case of copper oxid depolarizers. The electrolyte is practically always a solution of caustic soda, although in some cells caustic potash can be substituted for the caustic soda in whole or in part. In use, the aqueous electrolyte is shielded from the atmosphere by a floating layer of oil.

These various types of cells are usually sold dry, the cell containing a cake of caustic and a modicum of oil in a soluble capsule or in absorbent material. On addition of water, the caustic dissolves to form a solution and the oil goes to the surface.

We have found that the addition of a small amount of commercial zirconium oxid to the alkaline electrolyte in the case of any of these types of cells gives a cell of improved characteristics. For one thing, the electrodes stay cleaner; there is not an accumulation of foreign matter on the zinc electrode. And the electrical characteristics of the cell are improved; the voltage is more constant. In applying the present invention to an existing cell, we simply dissolve a little zirconia in the electrolyte after solution of the caustic; or, and more conveniently, a little powdered zirconia may be placed in a cell with the cake of caustic, the zirconia dissolving when water is added. As a rule, we use about 1 to 8 grams of zirconium white per liter of electrolyte. With one standard type of primary cell containing 4400 cc. of electrolyte, we make an addition of about 25 grams of commercial zirconium white. The addition has no disintegrating effect on the binder used for the depolarizing material; even when this binder is copper sulfate. With this cell, the ratio of zirconium white to caustic soda is 1 to 40, dry weight.

Some of the results secured by the addition of zirconia can also be secured by an addition of commercial titanium oxid, "titanium white". The $TiO_2$ in these preparations will usually dissolve in the alkaline solution, and we use grades which are soluble. Some of the titanium white on the market contains barium sulfate or "blanc fixe", and these preparations are not so suitable for our purposes. We often use titanium oxid in conjunction with zirconium oxid, replacing some of the latter with the former. For example, a mixture of 3 parts by weight of $ZrO_2$ and 1 part $TiO_2$ has some advantages.

As stated, the addition of the zirconium or titanium oxids makes for cleaner zinc surfaces with consequent improvements in the operation of the cell. There is an additional advantage. In batteries of the add-water type the solid alkali sent with the cell is dissolved in water at the point of use. Water supplies in different localities differ; and they often contain various impurities. We have found that by providing for the admixture of the small amounts of zirconia or titania specified the sometimes deleterious effects of impurities in the make-up water are largely neutralized. Better and more uniform results are secured in the cell operation. The electrolyte is stabilized, so to speak.

The explanation for the action of the addition agents specified is uncertain. But the advantages are real and are substantial.

While zirconia alone gives considerable improvement in cell operation there are some advantages to be gained by utilizing zirconia together with an iodid or a stannate in amount equivalent to a few grams per liter of electrolyte (usual strength). With such addition, we find that impurities in the electrolyte are precipitated and settle out on the bottom, and do not adhere to the zincs. The proportion of zirconia for best results is somewhat less when used in conjunction with an iodid or a stannate, than when used alone. The use of various iodids per se in copper oxid type cells is described and claimed in Patent No. 1,834,250, issued December 1, 1931 to Martin L. Martus and Edmund H. Becker. As stated there, elemental iodin or practically any iodin compound that is free from sulfur can be employed. In the present invention wherein iodids are utilized in conjunction with zirconia, there appears to be cooperation of some sort between the iodid and the zirconia, in that deposition of impurities on the zinc electrodes is minimized to a greater degree than that obtained by utilizing either zirconia alone or iodids alone in equivalent amount.

What we claim is:

1. A primary cell of the type using a depolarizer and a caustic alkaline solution as electrolyte with an admixture of zirconium oxid in the electrolyte.

2. The matter of claim 1 wherein the amount of zirconium oxid is about 1 to 8 grams per liter of electrolyte.

3. A primary cell of the type using a caustic alkaline solution as electrolyte and copper oxid as a depolarizer characterized by the presence of $ZrO_2$ in the electrolyte.

4. The cell of claim 1 wherein the electrolyte also contains some $TiO_2$.

5. A primary cell of the type using a zinc electrode, a depolarizer and a caustic alkaline solution as electrolyte with an admixture of zirconium oxid and an agent selected from the class consisting of iodids and stannates, whereby deposition of impurities from the electrolyte on to the zinc electrode is materially reduced.

MARTIN L. MARTUS.
EDMUND H. BECKER.